United States Patent [19]

Graf

[11] Patent Number: 5,822,164
[45] Date of Patent: Oct. 13, 1998

[54] PRE-ENGINEERED COMBINATION STARTER FOR MULTIPLE MOTOR SIZES

[75] Inventor: Arthur L. Graf, Pine Brook, N.J.

[73] Assignee: Eaton Corporation, Cleveland, Ohio

[21] Appl. No.: 858,833

[22] Filed: May 19, 1997

[51] Int. Cl.$^6$ ....................................................... H02H 5/00
[52] U.S. Cl. .............................. 361/23; 361/93; 361/103; 361/115
[58] Field of Search .................................. 361/23, 24, 25, 361/42, 90, 93, 100, 115, 103, 104, 31

[56] References Cited

U.S. PATENT DOCUMENTS 3,638,157  1/1972  Kruzic ........................................... 337/6
4,041,540  8/1977  Kampf .......................................... 361/24

Primary Examiner—Jeffrey A. Gaffin
Assistant Examiner—Stephen Jackson
Attorney, Agent, or Firm—Larry G. Vande Zande

[57] ABSTRACT

A pre-engineered single-rated combination starter is suitable for controlling any size motor ten horsepower and below in a three-phase 460 volt system. The assembled starter comprises an electronic overload relay having current sensors which do not carry motor current, a contactor and fuses sized for the ten horsepower motor, wire conductors sized corresponding to the fuse size, and an installation specification to use that specific size wire for connection with the motor.

4 Claims, 1 Drawing Sheet

PRE-ENGINEERED COMBINATION STARTER FOR MULTIPLE MOTOR SIZES

BACKGROUND OF THE INVENTION

This invention relates to electric motor control and specifically to motor starters for electric motors. More particularly, the invention relates to combination starters for electric motors.

Combination starters are used to control the starting and stopping of three-phase electric motors. A contactor, typically an electromagnetically operated contactor, has its switching contacts connected in the circuit of each phase of the electric motor to be controlled. External control means such as start and stop pushbuttons are connected in a control circuit for the contactor to effect energization or de-energization of the contactor, thereby closing or opening its switching contacts. When closed, the switching contacts connect the motor to a three-phase electrical source. An overload protection device such as an overload relay is connected between the contactor switching contacts and the motor. The overload relay typically is a thermally responsive device having heater elements in series with the switching contacts through which current flows to the motor. The heater elements are positioned in close proximity to heat responsive sensors such as a bimetal element or a meltable eutectic alloy element which operate to trip open the overload relay. A normally closed contact of the overload relay is connected in the contactor control circuit to de-energize the contactor upon an overload condition, single phasing or other problem that can damage the electric motor.

The ratings of the components of the combination starter are selected according to the particular application. The contactor is sized according to the horsepower of the electric motor. The overload relay heater elements are also sized according to the horsepower of the motor. The heater elements must be able to withstand the short term high in-rush current of the motor at start-up which is approximately 600 times rated current, but must respond to running overload current, fall load current and single phasing conditions. Thus the size of the contactor and the size of the heaters of a thermal overload protection device vary in accordance with the size of the motor.

The contactor and thermal overload device together form a motor starter. A combination starter adds a sheet metal enclosure in which the contactor and overload relay are mounted and further adds control elements. A disconnect device such as a fused knife switch is mounted within the enclosure. An operating mechanism is mounted on the enclosure, providing an external handle for operating the internally mounted disconnect. Fuses are provided between the disconnect and contactor switching contacts to protect the branch circuit and the overload heater elements from fault currents. The size of the fuse is selected according to motor size and the size of the heater elements.

In industrial applications, a typical manufacturing line comprising several conveyors and other motor driven apparatus utilizes numerous combination motor starters for various size motors ranging from a fractional horsepower to 10 or more horsepower. For each application, the installing electrician is required to select a combination starter having the appropriately sized contactor, and then select the appropriate overload heater elements and fuses. Each of these must be separately calculated, selected from stock and installed in the combination starter when installing the combination starter to the manufacturing line. A selection is also required with regard to the appropriate size wire conductors used to connect the motor to the combination starter. For those applications wherein the fuse size is calculated to be 15 amperes or below, a #14AWG can be utilized. If the fuse size is calculated to be 20 amps, the wire size must be #12AWG. However, it has been found that electricians working on industrial installations tend to use #12AWG for both 15 amp and 20 amp installations to reduce the number of separate items that they need to carry to and from the job site.

This invention responds to the installing electricians' desire for standardization of the electrical components of an industrial system and the electrical contractor's need to minimize installation time and inventory.

SUMMARY OF THE INVENTION

This invention provides a single rated combination starter that may be used in applications of electric motor sizes ranging from a fractional horsepower to a multiple horsepower motor. The components of the combination starter of this invention are sized according to the largest motor of the range. An electronic overload protective device is used which has a wide operating range that includes the full range of motor sizes that the combination starter is intended to accommodate. The electronic overload utilizes current transformers (CTs) or other current monitoring devices which do not require motor current to flow through the sensors and therefore do not need to be protected by the fuse. Accordingly, the fuses are selected to protect the branch circuit, i.e. the wiring between the fuses and the motor. That wiring is predetermined to be at least rated to the fuse size. Therefore, the installation instructions for the combination starter of this invention specify that the wiring shall be a particular wire size. The combination starter of this invention provides significant savings in engineering, inventory, installation time and ease of installation. One combination starter having a single rating may be stocked by the contractor, and the installer may use the same without regard to size or fuse calibration for the majority of motor sizes in the installation, if not the entire installation.

The invention, its features and advantages, will become more readily apparent when reading the following description and claims in conjunction with the accompanying drawings.

DETAILED DESCRIPTION OF THE PREFERRED EMBODIMENT

Figure 1:
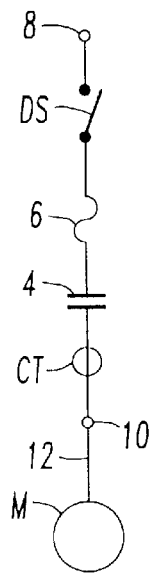
FIG. 1 is a schematic representation of the combination starter of this invention.

The combination starter of this invention is depicted schematically in FIG. 1 wherein a disconnect switch DS is connected in series with the switching contacts of a contactor 4 and with a load device such as a motor M. A current monitoring device such as a current transformer CT of electronic overload protective apparatus is disposed proximate the conductor between the contacts of contactor 4 and the motor M. A fuse 6 is installed between disconnect switch DS and the contactor 4, typically as a part of the disconnect switch DS. The line side termination comprises a lug terminal 8 which is also typically a part of the disconnect switch DS. The load side termination 10 may comprise a terminal unit having wire conductors that extend through the current transformer CT and attach to terminals of contactor 4. Wire conductor 12 is provided by the installer to extend between the load side termination terminals 10 and the motor M.

Figure 2:
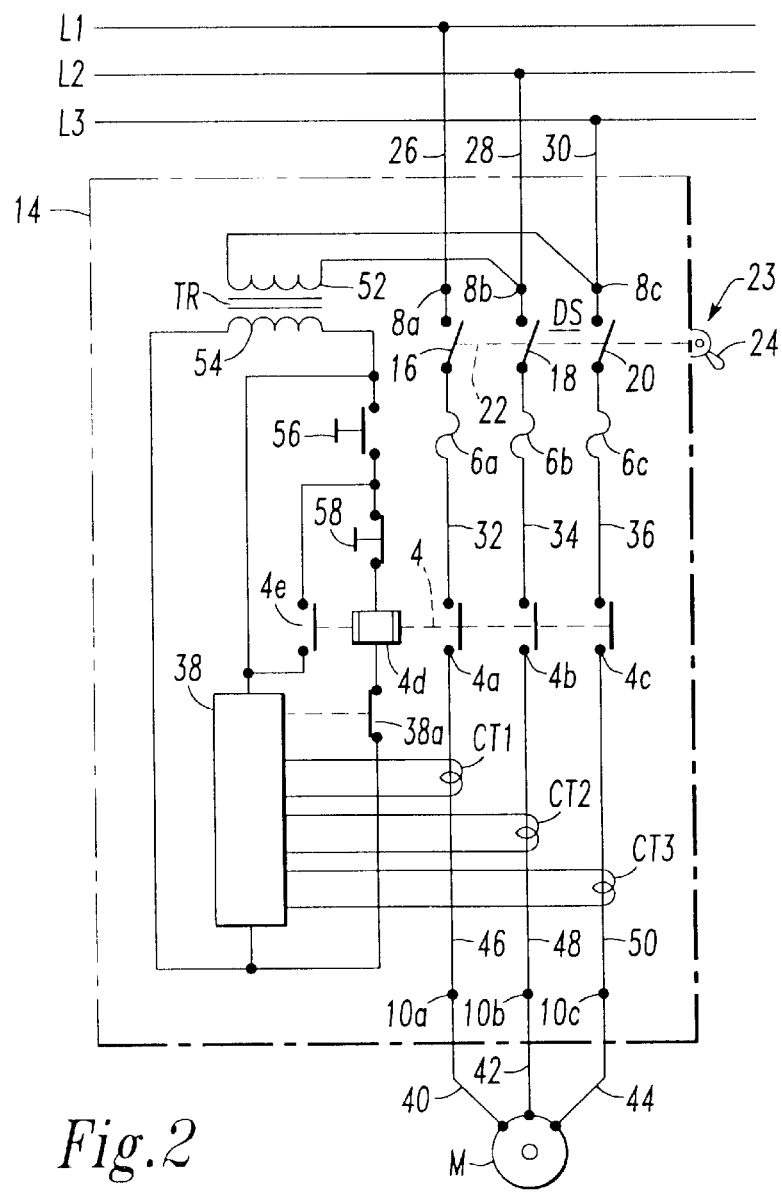
FIG. 2 is a wiring diagram of a combination starter constructed in accordance with this invention.

The combination starter of this invention is shown diagrammatically in FIG. 2. The combination starter typically comprises a sheet metal enclosure 14 represented by the dashed line rectangle. Disconnect switch DS is mounted within enclosure 14 and typically comprises a three-pole knife switch having contacts 16, 18 and 20 driven by a common connection 22 which is connected to an operating mechanism 23 mounted on the enclosure 14 and an externally accessible operator handle 24. The disconnect switch DS typically comprises fuse holders at the load side of the knife switch contacts 16, 18 and 20, for receiving the fuses 6a, 6b and 6c. Termination means such as wiring lugs 8a, 8b and 8c are generally provided on the disconnect switch DS at the line side for connection to a source of electrical power such as provided on lines L1, L2 and L3 by conductors 26, 28 and 30.

Contactor 4 is mounted within the enclosure 14 and comprises switching contacts 4a, 4b and 4c connected in series with the disconnect switch DS and the fuses 6a, 6b and 6c respectively by conductors 32, 34 and 36 respectively. Contactor 4 has an electromagnetic coil 4d connected in a control circuit to be described hereinafter for selectively opening and closing the contacts 4a, 4b and 4c. Current sensors such as current transformers CT1, CT2 and CT3 of an electronic overload protective device 38 are positioned below the contacts 4a, 4b and 4c of the electromagnetic relay 4. The motor M is connectable to the combination starter by a plurality of conductors 40, 42 and 44 which may be brought into the enclosure 14, fed through the current transformers CT1, CT2 and CT3, respectively, and wired to connecting lugs for the contacts 4a, 4b and 4c, respectively of the contactor 4. However, to facilitate this aspect of the installation, a separate termination unit comprising load side terminal lugs 10a, 10b and 10c and integrally connected conductors 46, 48 and 50 may be fed through the respective current transformers and attached to the terminals for contactor contacts 4a, 4b and 4c. This termination unit provides the wiring terminal lugs 10a, 10b and 10c below the current transformers and readily accessible from the lower end of the enclosure 14.

The motor M is controlled for starting, stopping and/or other functions such as jogging by a control circuit which is fed by a step-down transformer TR having its primary winding 52 connected across terminals 8b and 8c at the line side of disconnect switch DS. A start switch such as normally open pushbutton 56 and a stop switch such as normally closed pushbutton 58 are mounted to the enclosure 14 such that each operator button is externally accessible. The switches 56 and 58 are serially connected to the secondary winding 54 of transformer TR and to coil 4d of contactor 4. A maintaining contact 4e of contactor 4 is connected around start pushbutton 56 to maintain contactor coil 4d energized once momentary pushbutton 56 has been closed sufficiently to energize the coil 4d. When energized, contactor 4 closes the contacts 4a, 4b, 4c and 4e. If the disconnect switch DS has been operated to its closed condition, energization of contactor 4 completes the circuit between the power supply lines L1, L2 and L3 through the combination starter to the motor M. Momentary depression of stop pushbutton 58 will open the control circuit to the contactor coil 4d, de-energizing the same and causing the contacts 4a, 4b, 4c and 4e to open, thereby interrupting power to the motor M. The control module of electronic protective means such as the electronic overload relay 38 is connected across the secondary winding 54 of step-down transformer TR. Overload relay 38 has normally closed contacts 38a connected in the control circuit in series with coil 4d of contactor 4. In the event abnormal current is flowing to the motor M through any one or more of the current transformers CT1, CT2 or CT3, overload relay 38 will respond to open the contacts 38a, dropping out coil 4d of contactor 4 and opening the contacts 4a, 4b and 4c to disconnect motor M from the electrical power supply.

Present combination starters which utilize thermal overload relays to protect the motor require a calculated selection for the contactor size based on the horsepower of the motor to be controlled. The size of the overload heater elements of a thermal overload relay are also calculated according to the size of the motor. The heater elements are selected based upon the fall load current of the motor. The fuses are selected to protect the branch circuit and the heater elements of the thermal overload relay against damage by fault current conditions. Thus, a calculated selection of fuse size is also necessary based upon the size of the heater element which in turn is based on the size of the motor. All of these calculations vary significantly in a range of motor sizes extending from a fractional horsepower motor such as ¼ HP to a multiple horsepower motor such as 10 HP to the point wherein the number of possible combinations of elements within a combination motor starter can be very large.

The combination starter of this invention uses an electronic overload protection device such as electronic overload relay 38, wherein the current monitoring devices are current transformers such as CT1, CT2 and CT3 which do not conduct actual line current. The range of motor sizes that electronic overload relay 38 can protect and the trip points of the overload relay 38 are set by a programming device which may be a hand-held programmer, a programming key or may be set within a network controller if the installation is connected into a network. Therefore, the fuses only need to protect the wiring between the fuses and the motor. If the fuses are selected to be appropriate for the horsepower and full load current of the highest rated motor of the range and the conductors between the fuse and the motor are specified to be rated according to the fuse size then a single combination starter with its particular rated elements can be used throughout the range without requiring the installer to make any calculated selections. The combination starter can be stocked fully assembled. Any changes to the trip points of the electronic overload relay are done automatically in a programming mode, requiring no selection on the part of the installer. In a preferred embodiment, a combination starter applicable to a range of three-phase, 460 volt motors, size ¼ HP to 10 HP is provided with an IEC Size D contactor, a wide range electronic overload relay, 20 amp fuses and #12 AWG wire conductor. The combination starter specifies that #12AWG wire shall be used to connect the starter to the motor. The installer generally carries #12AWG on his supply cart to the exclusion of all or most other size wires so that standardization on the conductors from the combination starter to the motor is easily accomplished.

The aforedescribed combination starter represents a preferred and best mode embodiment of the invention as presently contemplated. However, it is to be understood that the invention is susceptible of various modifications without departing from the scope of the appended claims.

I claim:

1. A pre-engineered single-rated combination starter for controlling any one of a plurality of electric motors of different sizes within a predetermnined range of motor sizes at a predetermined voltage level, said starter being directly usable without requiring calculation of component ratings and sizes, comprising:

contactor means having a rated value appropriate for full load current of the maximum size motor of said range of motor sizes;

electronic overload protective means having an operating range including said range of motor sizes;

fuse means having a rated value appropriate for full load current of the maximum size motor of said range of motor sizes; and an installation requirement that wire conductors for connecting said motor to said combination starter are minimally a particular size which size corresponds to said fuse means rated value.

2. A pre-engineered single-rated combination starter for controlling any one of a plurality of motors of different sizes within a range of motor sizes at a predetermined voltage level, said starter being directly usable without requiring calculation of component ratings and sizes, comprising:

electronic overload protection means operable over a range inclusive of said range of motor sizes;

contactor means having a rated value appropriate for a maximum size motor of said range of motor sizes;

fuse means having a rated value appropriate for full load current of said maximum size motor, and wire conductor means for connecting said motor to said contactor means minimally rated for said rated value of said fuse means.

3. A pre-engineered single-rated combination starter for controlling an electric motor of a range of electric motor sizes, said starter being directly usable without requiring calculation of component ratings and sizes comprising:

electrical disconnect means selectively operable between open and closed positions;

line side termination means for connecting said disconnect means with an electrical source;

fuse means connected to said disconnect means, said fuse means having a rated value appropriate for full load current of the maximum size motor of said range of motor sizes;

contactor means having a rated value appropriate for said maximum size motor and said rated value of said fuse means, said contactor means having switching contacts connected in electrical series with said fuse means;

a control circuit for said contactor means;

electronic overload protective means having an operating range including said range of motor sizes, said overload protective means comprising overload responsive contacts in said control circuit and current sensing means for monitoring current in circuit with said switching contacts; and means for connecting said motor to said switching contacts comprising wire conductors minimally rated for said fuse means rated value.

4. A method of controlling any one of a plurality of electric motors of different sizes within a range of sizes at a predetermined voltage level with a single-rated combination starter which requires no calculation of component ratings and sizes comprising the steps of:

a. determining the largest size motor in said range of sizes;

b. selecting contactor means having a rated value appropriate to horsepower and full load current values of said largest size motor;

c. selecting electronic overload protective means having an operating range inclusive of said range of motor sizes;

d. selecting fuse means having a rated value appropriate to full load current value of said largest size motor; and e. connecting said fuse means in electrical series with switching contacts of said contactor means and with said motor using conductor means minimally rated for said rated value of said fuse means.

* * * * *